(12) United States Patent
Cao

(10) Patent No.: US 12,540,700 B2
(45) Date of Patent: Feb. 3, 2026

(54) CONNECTOR ASSEMBLY AND FEMALE CONNECTOR THEREOF

(71) Applicant: Illinois Tool Works Inc., Glenview, IL (US)

(72) Inventor: Cong Cao, Shanghai (CN)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 18/790,962

(22) Filed: Jul. 31, 2024

(65) Prior Publication Data

US 2025/0060060 A1 Feb. 20, 2025

(30) Foreign Application Priority Data

Aug. 15, 2023 (CN) .......................... 202311028803.3

(51) Int. Cl.
| | |
|---|---|
| *F16L 37/56* | (2006.01) |
| *F16L 37/14* | (2006.01) |
| *F16L 37/107* | (2006.01) |

(52) U.S. Cl.
CPC ............. *F16L 37/56* (2013.01); *F16L 37/144* (2013.01); *F16L 37/148* (2013.01); *F16L 37/107* (2013.01)

(58) Field of Classification Search
CPC ....... F16L 37/56; F16L 37/142; F16L 37/144; F16L 37/148; F16L 37/0985
USPC ................................ 285/122.1, 124.1, 130.1
See application file for complete search history.

(56) References Cited

U.S. PATENT DOCUMENTS

| 5,022,461 A * | 6/1991 | Potier ..................... F16L 37/56 285/921 |
| 5,150,926 A * | 9/1992 | Egli ........................ F16L 39/00 285/124.1 |
| 5,170,841 A * | 12/1992 | Briet ....................... F16L 37/56 285/921 |
| 6,178,816 B1 * | 1/2001 | Katzman ................... G01F 1/06 285/30 |
| 7,152,885 B2 * | 12/2006 | Takamatsu ............... F16L 39/00 285/124.1 |
| 9,789,278 B2 * | 10/2017 | Haggstrom .......... A61M 39/105 |
| 10,208,879 B2 * | 2/2019 | Hunt ..................... F16L 41/021 |
| 2020/0263643 A1 * | 8/2020 | Benner ................... F16L 37/56 |

* cited by examiner

*Primary Examiner* — David Bochna
(74) *Attorney, Agent, or Firm* — McAndrews, Held & Malloy, Ltd.

(57) ABSTRACT

A female connector comprises a female connector housing and a flow separating seal. The female connector housing comprises a connecting section, an inlet section and an outlet section of which each being generally tubular. The connecting section comprises a first end and a second end opposite to each other, and the inlet section and the outlet section are connected to the first end and in fluid connection with the connecting section. The connecting section receives the male connector housing via the second end. The flow separating seal is arranged in the female connector housing. The flow separating seal is configured to allow the inlet section and the outlet section respectively to fluidly connect with a male connector inlet channel and a male connector outlet channel in a sealed manner to form a connector assembly inlet channel and a connector assembly outlet channel separated from each other.

19 Claims, 6 Drawing Sheets

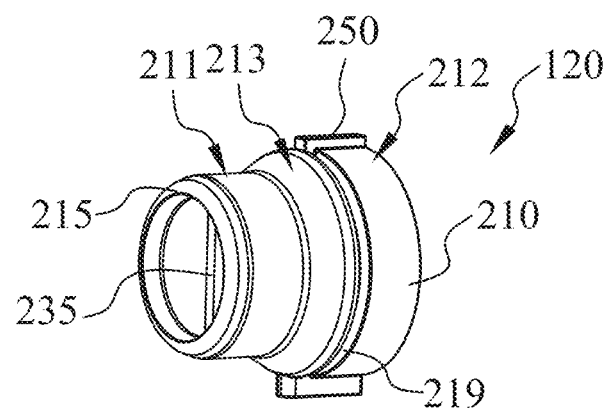
Fig. 2A
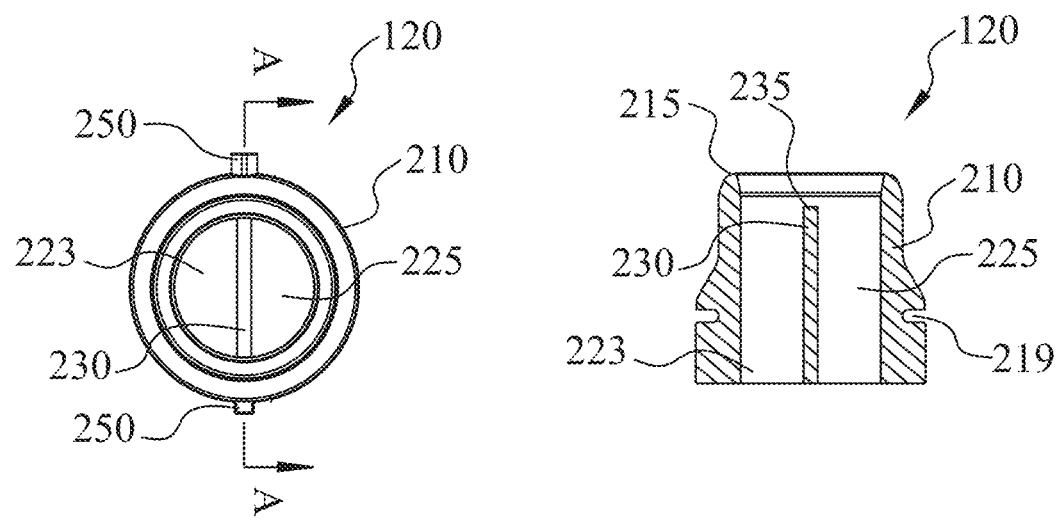
Fig. 2B
Fig. 2C

CONNECTOR ASSEMBLY AND FEMALE CONNECTOR THEREOF

RELATED APPLICATIONS

The present application claims the benefit of Chinese Patent Application No. 202311028803.3, filed Aug. 15, 2023, titled "Connector Assembly and Female Connector Thereof," the contents of which are hereby incorporated by reference.

TECHNICAL FIELD

The present disclosure relates to a female connector for connection with a male connector (or a pipe), and a connector assembly comprising the female connector.

BACKGROUND

Quick connectors (female connectors) for fluid connecting pipelines are widely used in industry. For example, in a piping system of a vehicle cooling system, an inlet connecting pipe and an outlet connecting pipe on an exhaust box (expansion tank or expansion pot) need to be connected to a corresponding fluid delivery hose via a quick connector, respectively, so that a fluid can flow out of the exhaust box to a to-be-cooled vehicle component, and the heated fluid can be delivered back to the exhaust box for exhausting after the cooling is completed.

SUMMARY

The present disclosure relates generally to a connector assembly, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 2A is a perspective view of a male connector of the connector assembly in FIG. 1A.

FIG. 2B is a left view of the male connector in FIG. 2A.

FIG. 2C is a cross-sectional view of the male connector in FIG. 2B along line A-A.

DETAILED DESCRIPTION

Figure 1A:
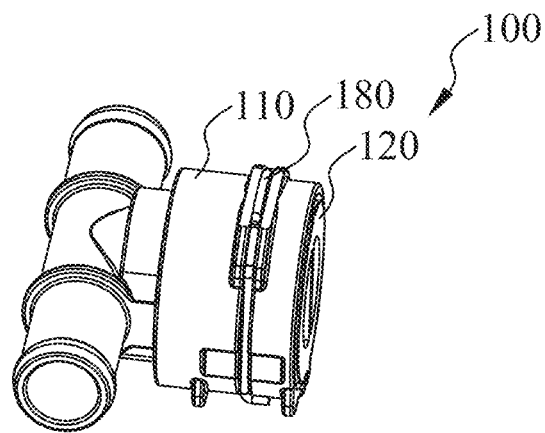
FIG. 1A is a perspective view of a connector assembly according to an aspect of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein is not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent to or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

According to a first aspect of the present disclosure, the present disclosure provides a connector assembly, which comprises a male connector and a female connector. The male connector comprises a male connector housing and a male connector separator. The male connector housing is generally tubular. The male connector separator is provided inside the male connector housing and defines in the male connector housing a male connector inlet channel and a male connector outlet channel arranged side by side in a radial direction of the male connector housing. The female connector comprises a female connector housing and a flow separating seal. The female connector housing comprises a connecting section, an inlet section and an outlet section of which each being generally tubular. The connecting section comprises a first end and a second end opposite to each other, and the inlet section and the outlet section are connected to the first end and in fluid connection with the connecting section. The male connector housing is inserted into the connecting section via the second end of the connecting section. The flow separating seal allows the inlet section and the outlet section respectively to fluidly connect with the male connector inlet channel and the male connector outlet channel in a sealed manner, so as to form a connector assembly inlet channel and a connector assembly outlet channel that are separated from each other.

According to the connector assembly of the first aspect described above, the inlet section and the outlet section of the female connector housing are formed of a straight pipe. The straight pipe has a connecting port through its pipe wall to fluidly connect the straight pipe with the connecting section. The female connector further comprises a female connector separator provided in the straight pipe, the female connector separator extends transversely to an axial direction of the straight pipe to divide the straight pipe into the inlet section and the outlet section.

According to the connector assembly of the first aspect described above, the flow separating seal comprises a radial sealing portion and a circumferential sealing portion. The circumferential sealing portion is arranged around the radial sealing portion, and the radial sealing portion is connected to the circumferential sealing portion at its opposite ends in a length direction. The circumferential sealing portion connects the male connector housing to the connecting port in a sealed manner. The radial sealing portion connects the female connector separator to the male connector separator in a sealed manner.

According to the connector assembly of the first aspect described above, the female connector separator has an extension extending from the connecting port into the connecting section, and the radial sealing portion is wrapped around the extension, such that the extension retains the flow separating seal in the female connector housing.

According to the connector assembly of the first aspect described above, the male connector housing has a male connector housing proximal surface. The male connector separator has a male connector separator proximal surface. The male connector separator proximal surface is indented inwardly relative to the male connector housing proximal surface. The radial sealing portion comprises end sealing surfaces provided at the two ends thereof, and a radial sealing surface connecting the end sealing surfaces. The extension of the female connector separator and the radial sealing portion at least partially extend into the male connector housing. The radial sealing surface of the radial sealing portion abuts against the male connector separator proximal surface, the end sealing surfaces of the radial sealing portion abut against an inner surface of the male connector housing, and the circumferential sealing portion is clamped between the male connector housing proximal surface and the female connector housing around the connecting port.

According to the connector assembly of the first aspect described above, the connecting section has a first end opening at the first end. The connecting port is smaller than the first end opening to form a stepped surface between the connecting port and the first end opening. The circumferential sealing portion is clamped between the male connector housing proximal surface and the stepped surface.

According to the connector assembly of the first aspect described above, the male connector separator is radially and centrally arranged in the male connector housing.

According to the connector assembly of the first aspect described above, the male connector separator is formed integrally with the male connector housing.

According to the connector assembly of the first aspect described above, the female connector separator is formed integrally with the female connector housing.

According to the connector assembly of the first aspect described above, the male connector separator and the female connector separator are plate-shaped elements with the same thickness.

According to the connector assembly of the first aspect described above, the circumferential sealing portion comprises a curved cross section that protrudes toward the male connector housing.

According to the connector assembly of the first aspect described above, the male connector housing is provided with a guide, and the female connector housing is provided with a guide mating part. The guide cooperates with the guide mating part such that the male connector housing is inserted into the female connector housing in a predetermined orientation in a rotational direction about an axis of the male connector housing.

According to a second aspect of the present disclosure, the present disclosure provides a female connector for cooperating with a male connector having a male connector inlet channel and a male connector outlet channel to form a connector assembly. The female connector comprises a female connector housing and a flow separating seal. The female connector housing comprises a connecting section, an inlet section and an outlet section of which each being generally tubular. The connecting section comprises a first end and a second end opposite to each other, and the inlet section and the outlet section are connected to the first end and in fluid connection with the connecting section. The connecting section receives the male connector housing via the second end. The flow separating seal is arranged in the female connector housing. The flow separating seal is configured to allow the inlet section and the outlet section respectively to fluidly connect with the male connector inlet channel and the male connector outlet channel in a sealed manner, so as to form a connector assembly inlet channel and a connector assembly outlet channel that are separated from each other.

According to the female connector of the second aspect described above, the inlet section and the outlet section of the female connector housing are formed of a straight pipe. The straight pipe has a connecting port through its pipe wall to fluidly connect the straight pipe with the connecting section. The female connector housing further comprises a female connector separator provided in the straight pipe. The female connector separator extends transversely to an axial direction of the straight pipe to divide the straight pipe into the inlet section and the outlet section.

According to the female connector of the second aspect described above, the flow separating seal comprises a radial sealing portion and a circumferential sealing portion. The circumferential sealing portion is arranged around the radial sealing portion, and the radial sealing portion is connected to the circumferential sealing portion at its opposite ends in a length direction. The circumferential sealing portion is configured to connect the male connector housing to the connecting port in a sealed manner. The radial sealing portion is configured to connect the female connector separator to the male connector separator in the male connector housing in a sealed manner.

According to the female connector of the second aspect described above, the female connector separator has an extension extending from the connecting port into the connecting section, and the radial sealing portion is wrapped around the extension, such that the extension retains the flow separating seal in the female connector housing.

According to the female connector of the second aspect described above, the connecting section has a first end opening at the first end, and the connecting port is smaller than the first end opening to form a stepped surface between the connecting port and the first end opening. The circumferential sealing portion abuts against the stepped surface.

According to the female connector of the second aspect described above, the female connector separator is formed integrally with the female connector housing.

According to the female connector of the second aspect described above, the circumferential sealing portion comprises a curved cross section that protrudes toward the male connector received by the female connector.

According to the female connector of the second aspect described above, the male connector housing is provided with a guide, and the female connector housing is provided with a guide mating part. The guide cooperates with the guide mating part such that the male connector housing is inserted into the female connector housing in a predetermined orientation in a rotational direction about an axis of the male connector housing.

Figure 1B:
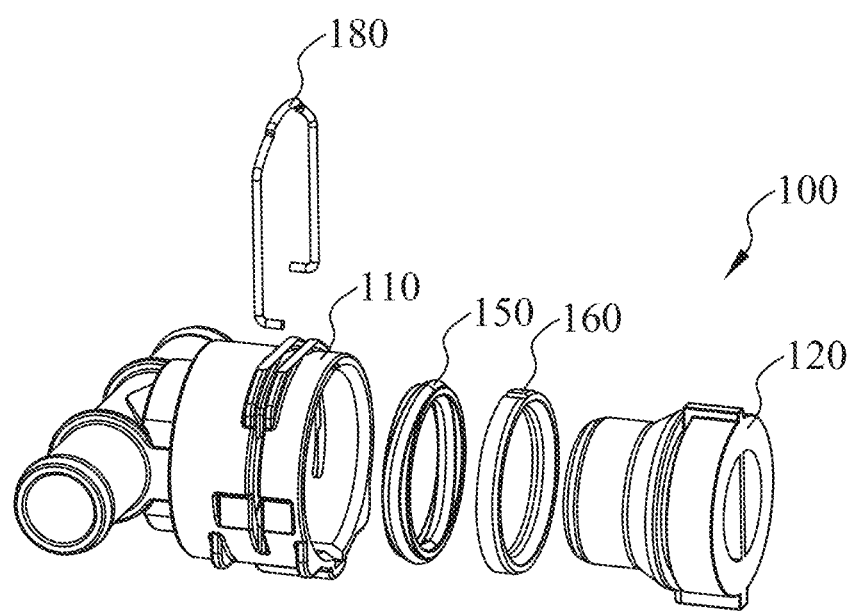
FIG. 1B is an exploded view of the connector assembly shown in FIG. 1A.
Figure 1C:
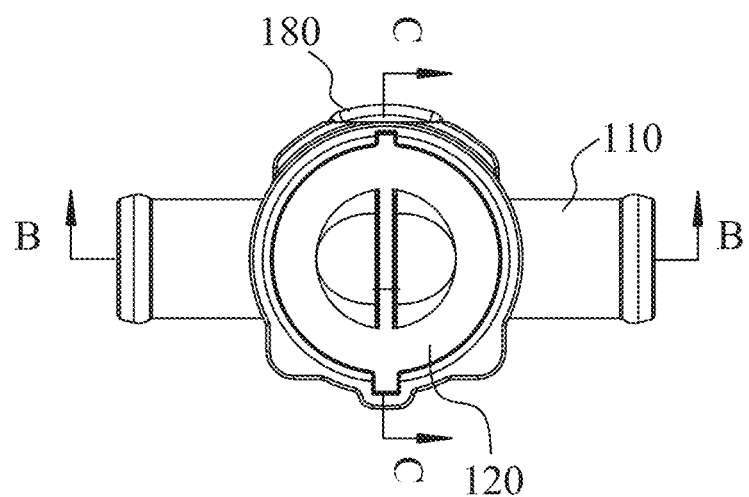
FIG. 1C is a front view of the connector assembly in FIG. 1A.
Figure 1D:
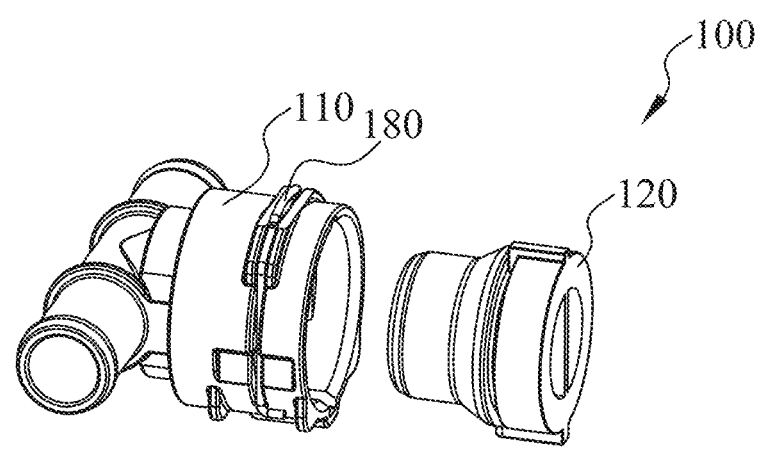
FIG. 1D is an assembly process diagram of the connector assembly in FIG. 1A.

FIGS. 1A-1D show the overall structure of a connector assembly 100 according to an aspect of the present disclosure. FIG. 1A is a perspective view of the connector assembly 100; FIG. 1B is an exploded view of the connector assembly 100; FIG. 1C is a front view of the connector assembly in FIG. 1A; and FIG. 1D is an assembly process diagram of the connector assembly in FIG. 1A.

As shown in FIGS. 1A-1C, the connector assembly 100 comprises a female connector 110, a male connector 120, a seal ring 150, a limit ring 160, and a latch 180. The female connector 110 receives at least part of the male connector 120 and is secured to the male connector 120 via the latch 180. The latch 180 is, for example, a U-shaped resilient clip. The seal ring 150 sleeves over the male connector 120 and is clamped between the female connector 110 and the male connector 120 to connect the female connector 110 with the male connector 120 in a sealed manner. The limit ring 160 is configured to limit the seal ring 150.

As shown in FIG. 1D, during assembly, the seal ring 150, the limit ring 160, and the latch 180 are first mounted in or on the female connector 110, and then the male connector 120 is inserted into the female connector 110 to achieve the connection of the two.

Figure 5A:
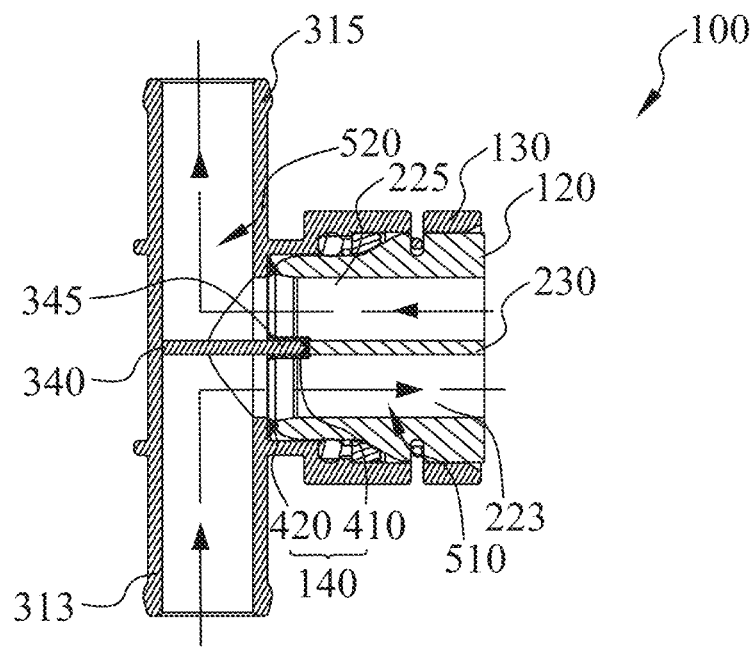
FIG. 5A is a cross-sectional view of the connector assembly in FIG. 1C along line BB.

The connector assembly 100 of the present disclosure has two channels therein, including a connector assembly inlet channel 510 and a connector assembly outlet channel 520 (shown in FIG. 5A). That is, the present disclosure achieves both functions of fluid input and fluid output via a single connector assembly, without the need for two separate connector assemblies to achieve the both functions. To this end, the male connector 120 and the female connector 130 of the connector assembly 100 each have an inlet channel and an outlet channel. As an example, the male connector 120 may be a connecting pipe on an exhaust box of a vehicle cooling system, having both functions of an inlet connecting pipe and an outlet connecting pipe. Thus, both functions of input connection and output connection of a fluid can be achieved by means of only one tubular member.

FIGS. 2A-2C show the specific structure of the male connector 120. FIG. 2A is a perspective view of the male connector 120, FIG. 2B is a left view of the male connector 120 in FIG. 2A, and FIG. 2C is a cross-sectional view of the male connector 120 in FIG. 2B along line A-A. As shown in FIGS. 2A-2C, the male connector 120 comprises a male connector housing 210 that is generally tubular. The male connector 120 further comprises a male connector separator 230 provided inside the male connector housing 210 and defining in the male connector housing 210 a male connector inlet channel 223 and a male connector outlet channel 225. The male connector inlet channel 223 and the male connector outlet channel 225 are arranged side by side in a radial direction of the male connector housing 210.

In the aspect shown in the figures, the male connector housing 210 defines a cylindrical cavity, and the male connector separator 230 is generally in the form of a plate, which is disposed along an axial direction of the male connector housing 210 to divide the cavity defined by the male connector housing 210 into two parts in the axial direction. In some aspects, the male connector separator 230 is radially and centrally arranged in the cavity of the male connector housing 210. The male connector separator 230 may be formed integrally with the male connector housing 210, and may also be fixedly connected to the male connector housing 210 in other manners.

The male connector 120 further comprises a guide 250 provided on the male connector housing 210 and used to cooperate with a guide mating part 350 provided on the female connector housing 310 (see FIG. 3B) such that the male connector housing 210 is inserted into the female connector housing 310 in a predetermined orientation (or direction) in a rotational direction about an axis of the male connector housing. In the aspect shown in the figures, the guide 250 is a protrusion protruding outwardly from an outer surface of the male connector housing 210. The male connector housing 210 is provided with two such guides 250. The two guides 250 are symmetrically disposed in position relative to an axis of the male connector housing 210, and are adjacent to two opposite radial ends of the male connector separator 230, respectively.

The male connector 120 further comprises a locking groove 219 provided on the male connector housing 210 and configured to receive the latch 180. The locking groove 219 is formed by recessing inwardly from the outer surface of the male connector housing 210 and extends along the circumference of the male connector housing 210 to form an annular groove.

The male connector housing 210 comprises a proximal end (left end in FIG. 2A) and a distal end (right end in FIG. 2A) and has a proximal surface 215 at the proximal end. The outer surface of the male connector housing 210 includes three sections, i.e., a first section 211 close to the proximal end, a second section 212 close to the distal end, and a third section 213 between the first section 211 and the second section 212. The first section 211 and the second section 212 are cylindrical, and the diameter of the first section 211 is smaller than the diameter of the second section 212. The third section 213 connects the first section 211 to the second section 212 and is generally shaped as a truncated cone. The locking groove 219 and the guides 250 are provided on the second section 212. The seal ring 150 sleeves over the first section 211 and the limit ring 160 sleeves over the third section 213. The shape of the truncated cone of the third section 213 restricts axial movements of the seal ring 150 and the limit ring 160 on the male connector housing 210.

As shown in FIGS. 2A and 2C, the male connector separator 230 has a male connector separator proximal surface 235 close to the proximal end of the male connector housing 210, and the male connector separator proximal surface 235 is indented inwardly relative to the male connector housing proximal surface 215, and accordingly is within the male connector housing 210. In addition, an inner surface of the male connector housing 210 is shaped as an outwardly expanding bell mouth near the proximal end of the male connector housing 210 such that a radial sealing portion 410 of a flow separating seal 390, as will be described later, is easier to be inserted into the male connector housing 210.

Figure 3A:
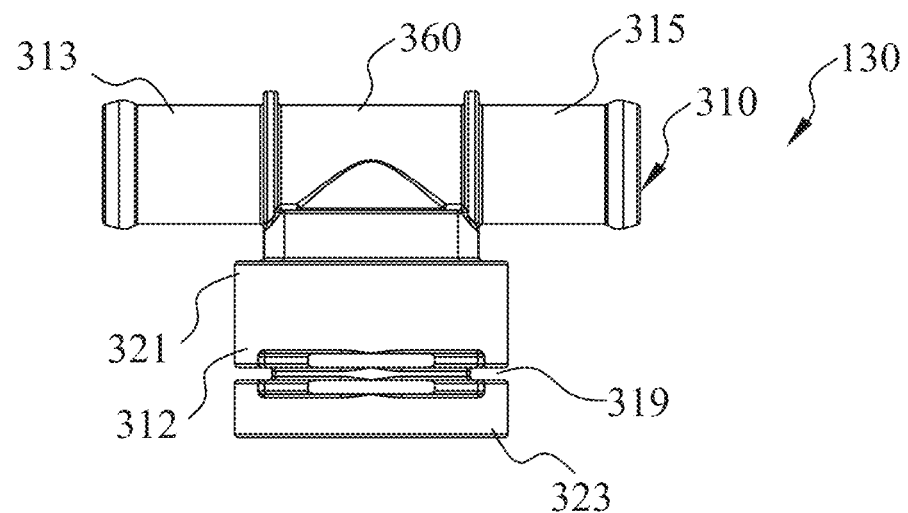
FIG. 3A is a top view of a female connector of the connector assembly in FIG. 1A.
Figure 3B:
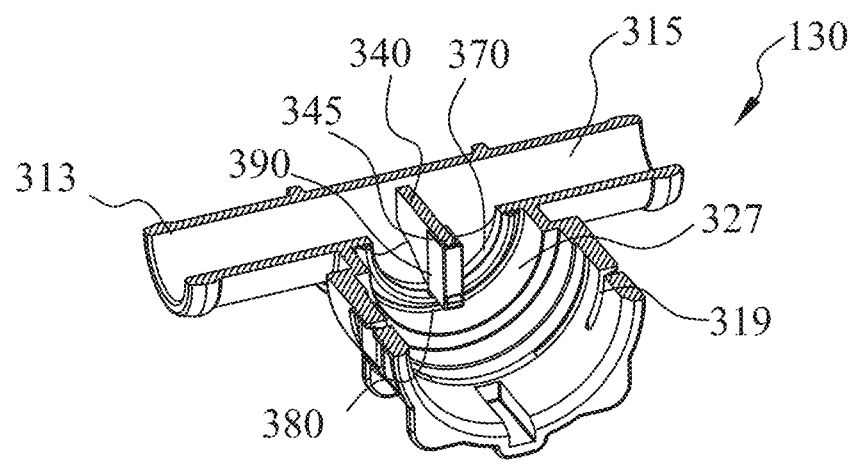
FIG. 3B is an axial cross-sectional view of the female connector in FIG. 3A.

FIGS. 3A and 3B show the specific structure of the female connector 110. FIG. 3A is a top view of the female connector 110, and FIG. 3B is an axial cross-sectional view of the female connector 110. As shown in FIG. 3B, the female connector 110 comprises a female connector housing 310, a female connector separator 340, and the flow separating seal 390. The female connector separator 340 and the flow separating seal 390 are provided within the female connector housing 310 and accordingly are not visible in FIG. 3A.

As shown in FIGS. 3A and 3B, the female connector housing 310 comprises an inlet section 313, an outlet section 315 and a connecting section 312 of which each being generally tubular. The connecting section 312 comprises a first end 321 and a second end 323 opposite each other. The inlet section 313 and the outlet section 315 are connected to the first end 321 of the connecting section 312. The male connector 120 is connected to the female connector housing 310 via the second end 323 of the connecting section 312.

More specifically, the inlet section 313 and the outlet section 315 are formed of a straight pipe 360, and the straight pipe 360 extends generally perpendicularly to (or transversely to) an axial direction of the connecting section 312. The straight pipe 360 comprises a connecting port 370. The connecting port 370 passes through a pipe wall of the straight pipe 360 to fluidly connect the straight pipe 360 with the connecting section 312. The female connector housing 310 has an overall structure as a tee tube when viewed externally, and comprises three ports which are formed from the inlet section 313, the outlet section 315, and the connecting section 312, respectively.

As shown in FIG. 3B, the female connector separator 340 of the female connector 110 is provided in the straight pipe 360, which extends transversely to an axial direction of the straight pipe 360 to divide the straight pipe 360 into the inlet section 313 and outlet section 315 as described above. In the aspect shown in the figures, the female connector separator 340 has an extension 345 extending from the connecting port 370 into the connecting section 312. The connecting section 312 has a first end opening 327 at the first end 321, and the connecting port 370 of the straight pipe 360 is smaller than the first end opening 327 so that a stepped surface 380 is formed between the connecting port 370 and the first end opening 327. The extension 345 of the female connector separator 340 extends out of the stepped surface 380. The female connector separator 340 is also generally plate-shaped and has a thickness generally the same as that of the male connector separator 230.

The flow separating seal 390 is configured to allow the inlet section 313 and the outlet section 315 of the female connector 110 respectively to fluidly connect with the male connector inlet channel 223 and the male connector outlet channel 225 of the male connector 120 in a sealed manner, so as to form a connector assembly inlet channel 510 and a connector assembly outlet channel 520 that are separated from each other. In the aspect shown in the figures, the flow separating seal 390 is retained in the female connector housing 310 by the extension 345 of the female connector separator 340.

It should be noted that in the illustrated aspect, the inlet section 313 and the outlet section 315 are formed of a single straight pipe 360 extending generally perpendicularly to the axial direction of the connecting section 312, but in other aspects, the straight pipe 360 may form a non-90-degree included angle with the axial direction of the connecting section 312, or the inlet section 313 and the outlet section 322 may be formed of a bent pipe, or the inlet section 313, the outlet section 315, and the connecting section 312 may be formed of three pipes, respectively, and the three pipes are interconnected to form a Y shape or other shape.

Figures 4A, 4C:
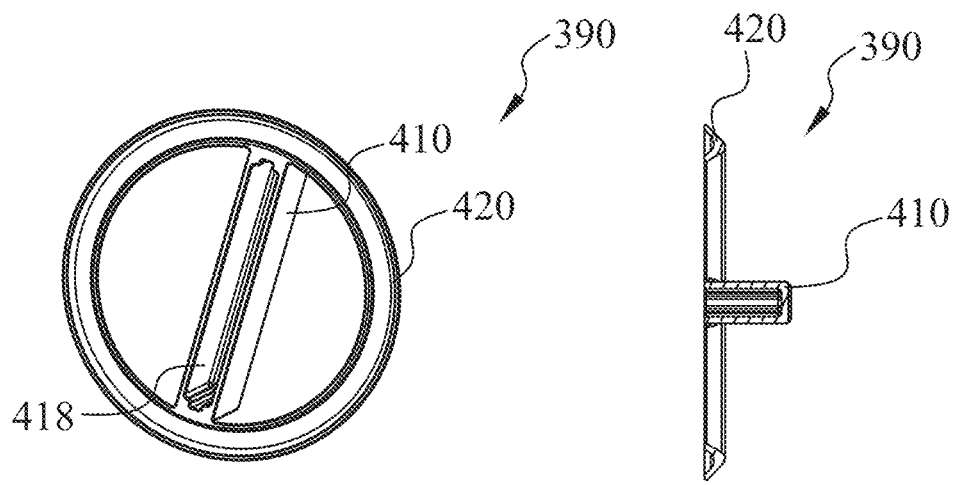
FIG. 4A is a perspective view of a flow separating seal of the connector assembly in FIG. 1A, viewed from front to back.
FIG. 4C is a radial cross-sectional view of a flow separating seal of the connector assembly in FIG. 1A.
Figure 4B:
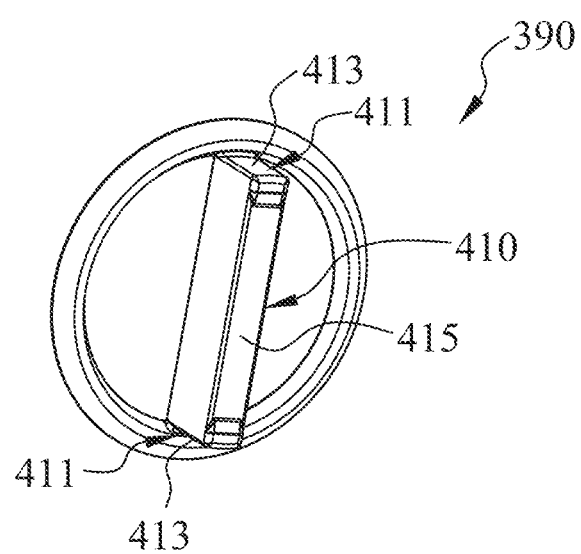
FIG. 4B is a perspective view of a flow separating seal of the connector assembly in FIG. 1A, viewed from back to front.

FIGS. 4A-4C show the specific structure of the flow separating seal 390. FIG. 4A is a perspective view of the flow separating seal 390 viewed from front to back, FIG. 4B is a perspective view of the flow separating seal 390 viewed from back to front, and FIG. 4C is a radial cross-sectional view of the flow separating seal 390. The flow separating seal 390 is integrally formed from an elastic rubber material. As shown in FIGS. 4A-4C, the flow separating seal 390 comprises a radial sealing portion 410 and a circumferential sealing portion 420. The circumferential sealing portion 420 is configured around the radial sealing portion 410, and the radial sealing portion 410 is connected to the circumferential sealing portion 420 at its two opposite ends 411 in a length direction. The radial sealing portion 410 comprises end sealing surfaces 413 provided at the two opposite ends 411 thereof, and a radial sealing surface 415 connecting the end sealing surfaces 413. The radial sealing portion 410 forms a cavity 418 and receives the extension 345 of the female connector separator 340 via the cavity 418. The cavity 418 is sized to be slightly smaller than the female connector separator 340 such that the radial sealing portion 410 is wrapped around the female connector separator 340 to be retained in the female connector housing 310 via the female connector separator 340.

As shown in FIG. 4C, a radial middle portion of the circumferential sealing portion 420 is curved to the right (toward the radial sealing surface 415 of the radial sealing portion 410) such that the circumferential sealing portion 420 has a curved cross-section. When the female connector 110 receives the male connector 120, the circumferential sealing portion 420 protrudes toward the male connector 120.

Figure 5B:
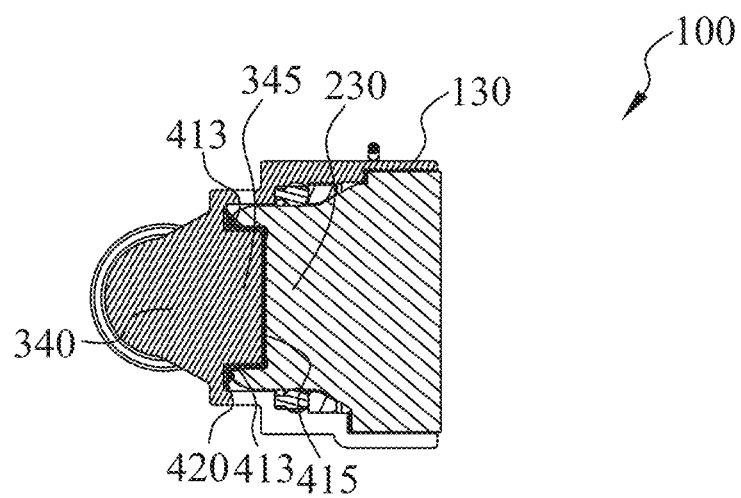
FIG. 5B is a cross-sectional view of the connector assembly in FIG. 1C along line CC.

FIGS. 5A and 5B illustrate a cooperative relationship of the female connector 110 and the male connector 120 when the female connector receives and is secured to the male connector. FIG. 5A is a cross-sectional view of the connector assembly 100 in FIG. 1C along line B-B, and FIG. 5B is a cross-sectional view of the connector assembly in FIG. 1C along line C-C. As shown in FIGS. 5A and 5B, when the female connector 110 receives and is secured to the male connector 120, the male connector 120 is within the connecting section 312 of the female connector housing 310, and the extension 345 of the female connector separator 340 and the radial sealing portion 410 of the flow separating seal 390 retained thereon extend at least partially into the male connector housing 210. Moreover, the female connector separator 340 is aligned with the male connector separator 230 such that the two appear to extend continuously. The radial sealing portion 410 of the flow separating seal 390 is clamped between the male connector separator 230 and the female connector separator 340, with the radial sealing surface 415 abutting against the male connector separator 230. In addition, the two end sealing surfaces 413 of the radial sealing member 410 abut against the inner surface of the male connector housing 210. The circumferential sealing portion 420 of the flow separating seal 390 is clamped between the male connector housing proximal surface 215 of the male connector 120 and the stepped surface 380 of the female connector housing 310. Therefore, the circumferential sealing portion 420 connects the male connector housing 210 to the connecting port 370 in a sealed manner, and the radial sealing portion 410 connects the female connector separator 340 to the male connector separator 230 in a sealed manner.

Thus, the joint between the inlet section 313 of the female connector 110 and the male connector inlet channel 223 and the joint between the outlet section 315 of the female connector 110 and the male connector outlet channel 225 are both sealed by the flow separating seal. Accordingly, via the flow separating seal 390, the inlet section 313 and the outlet section 315 of the female connector 110 are respectively in fluid connection with the male connector inlet channel 223 and the male connector outlet channel 225 of the male connector 120 in a sealed manner, so as to form the connector assembly inlet channel 510 and the connector assembly outlet channel 520 that are separated from each other.

The male connector 120 of the present disclosure, having two channels (the inlet channel 223 and the outlet channel 225), may be provided, for example, on the exhaust box of the vehicle cooling system as a connecting pipe that forms an inlet and an outlet of the exhaust box. The female connector 130 of the present disclosure can be used to connect the inlet channel 223 and the outlet channel 225 in the male connector 120 on the exhaust box to other pipelines respectively such that the exhaust box can be connected to the vehicle component to be cooled into a loop via the connector assembly inlet channel 510 and the connector assembly outlet channel 520, enabling a cooling liquid to flow out of the exhaust box to the vehicle component to be cooled and to flow back into the exhaust box for exhausting.

Compared with the approach of providing an inlet connecting pipe and an outlet connecting pipe separated from each other, the approach of providing only one male connector as a connecting pipe can not only make the exhaust box have a simpler shape, but also simplify the operation of connecting the exhaust box and external pipelines. The female connector of the present disclosure can be used with such a connecting pipe as described above to form the connector assembly having both inlet and outlet channels. The female connector of the present disclosure is simple in structure, easy to manufacture, and convenient to assemble. In addition, the flow separating seal of the present disclosure allows the two channels in the female connector and the two channels in the male connector (connecting pipe) to be connected in a sealed manner respectively, and enables the two channels formed after connection to be separated from each other, thereby meeting the requirements for application scenarios in which the two channels need to be separated from each other.

Although the present disclosure is described with reference to the examples of aspects outlined above, various alternatives, modifications, variations, improvements and/or substantial equivalents, which are known or anticipated at present or to be anticipated before long, may be obvious to those of at least ordinary skill in the art. In addition, the technical effects and/or technical problems described in this specification are exemplary rather than limiting; therefore, the disclosure in this specification may be used to solve other technical problems and may have other technical effects. Accordingly, the examples of the aspects of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents.

What is claimed is:

1. A connector assembly, comprising:
a male connector comprising
a male connector housing being generally tubular; and
a male connector separator being provided inside the male connector housing and defining in the male connector housing a male connector inlet channel and a male connector outlet channel arranged side by side in a radial direction of the male connector housing; and
a female connector comprising
a female connector housing comprising a connecting section, an inlet section and an outlet section of which each being generally tubular, the connecting section comprising a first end and a second end opposite to each other, the inlet section and the outlet section being connected to the first end and in fluid connection with the connecting section, and the male connector housing being inserted into the connecting section via the second end of the connecting section; and
a flow separating seal to allow the inlet section and the outlet section respectively to fluidly connect with the male connector inlet channel and the male connector outlet channel in a sealed manner, so as to form a connector assembly inlet channel and a connector assembly outlet channel that are separated from each other,
wherein the flow separating seal comprises a radial sealing portion and a circumferential sealing portion, the circumferential sealing portion being arranged around the radial sealing portion, and the radial sealing portion being connected to the circumferential sealing portion at its opposite ends in a length direction,
wherein the male connector housing has a male connector housing proximal end located at an axial end surface of the male connector housing, and
wherein the circumferential sealing portion is clamped between the male connector housing proximal end and the female connector housing around a connecting port.

2. The connector assembly according to claim 1, wherein the inlet section and the outlet section of the female connector housing are formed of a straight pipe, the straight pipe having a connecting port through its pipe wall to fluidly connect the straight pipe with the connecting section; and
the female connector further comprises a female connector separator provided in the straight pipe, the female connector separator extending transversely to an axial direction of the straight pipe to divide the straight pipe into the inlet section and the outlet section.

3. The connector assembly according to claim 2, wherein the radial sealing portion connects the female connector separator to the male connector separator in a sealed manner.

4. The connector assembly according to claim 3, wherein the female connector separator has an extension extending from the connecting port into the connecting section, and the radial sealing portion is wrapped around the extension such that the extension retains the flow separating seal in the female connector housing.

5. The connector assembly according to claim 4, wherein the male connector separator has a male connector separator proximal surface, and the male connector separator proximal surface being indented inwardly relative to the male connector housing proximal end;

the radial sealing portion comprises end sealing surfaces provided at the two ends thereof, and a radial sealing surface connecting the end sealing surfaces; and the extension of the female connector separator and the radial sealing portion at least partially extend into the male connector housing, wherein the radial sealing surface of the radial sealing portion abuts against the male connector separator proximal surface, and the end sealing surfaces of the radial sealing portion abut against an inner surface of the male connector housing.

6. The connector assembly according to claim 5, wherein the connecting section has a first end opening at the first end, and the connecting port is smaller than the first end opening to form a stepped surface between the connecting port and the first end opening, and the circumferential sealing portion is clamped between the male connector housing proximal end and the stepped surface.

7. The connector assembly according to claim 2, wherein the female connector separator is formed integrally with the female connector housing.

8. The connector assembly according to claim 2, wherein the male connector separator and the female connector separator are plate-shaped elements with the same thickness.

9. The connector assembly according to claim 3, wherein the circumferential sealing portion comprises a curved cross section that protrudes toward the male connector housing.

10. The connector assembly according to claim 1, wherein the male connector separator is radially and centrally arranged in the male connector housing.

11. The connector assembly according to claim 1, wherein the male connector separator is formed integrally with the male connector housing.

12. The connector assembly according to claim 1, wherein the male connector housing is provided with a guide, the female connector housing is provided with a guide mating part, and the guide cooperating with the guide mating part such that the male connector housing is inserted into the female connector housing in a predetermined orientation in a rotational direction about an axis of the male connector housing.

13. A female connector for cooperating with a male connector having a male connector inlet channel and a male connector outlet channel to form a connector assembly, the female connector comprising:

a female connector housing comprising a connecting section, an inlet section and an outlet section of which each being generally tubular, the connecting section comprising a first end and a second end opposite to each other, the inlet section and the outlet section being connected to the first end and in fluid connection with the connecting section, and the connecting section receiving the male connector housing via the second end; and a flow separating seal being arranged in the female connector housing and configured to fluidly connect the inlet section and the outlet section respectively with the male connector inlet channel and the male connector outlet channel in a sealed manner, so as to form a connector assembly inlet channel and a connector assembly outlet channel that are separated from each other, wherein the flow separating seal comprises a radial sealing portion and a circumferential sealing portion, the circumferential sealing portion being arranged around the radial sealing portion, and the radial sealing portion being connected to the circumferential sealing portion at its opposite ends in a length direction, and wherein the circumferential sealing portion is configured to be clamped between a male connector housing proximal end of the male connector and the female connector housing around a connecting port, wherein the male connector housing proximal end is located at an axial end surface of the male connector housing.

14. The female connector according to claim 13, wherein the inlet section and the outlet section of the female connector housing are formed of a straight pipe, the straight pipe having a connecting port through its pipe wall to fluidly connect the straight pipe with the connecting section; and the female connector housing further comprises a female connector separator provided in the straight pipe, and the female connector separator extending transversely to an axial direction of the straight pipe to divide the straight pipe into the inlet section and the outlet section.

15. The female connector according to claim 14, wherein the radial sealing portion is configured to connect the female connector separator to a male connector separator in the male connector housing in a sealed manner.

16. The female connector according to claim 15, wherein the female connector separator has an extension extending from the connecting port into the connecting section, and the radial sealing portion is wrapped around the extension, such that the extension retains the flow separating seal in the female connector housing.

17. The female connector according to claim 16, wherein the connecting section has a first end opening at the first end, the connecting port is smaller than the first end opening to form a stepped surface between the connecting port and the first end opening, and the circumferential sealing portion abuts against the stepped surface.

18. The female connector according to claim 14, wherein the female connector separator is formed integrally with the female connector housing.

19. The female connector according to claim 15, wherein the circumferential sealing portion comprises a curved cross section that protrudes toward the male connector received by the female connector.

* * * * *